Dec. 13, 1938.  A. E. HART  2,140,051
CAMERA SUPPORT
Filed July 21, 1937
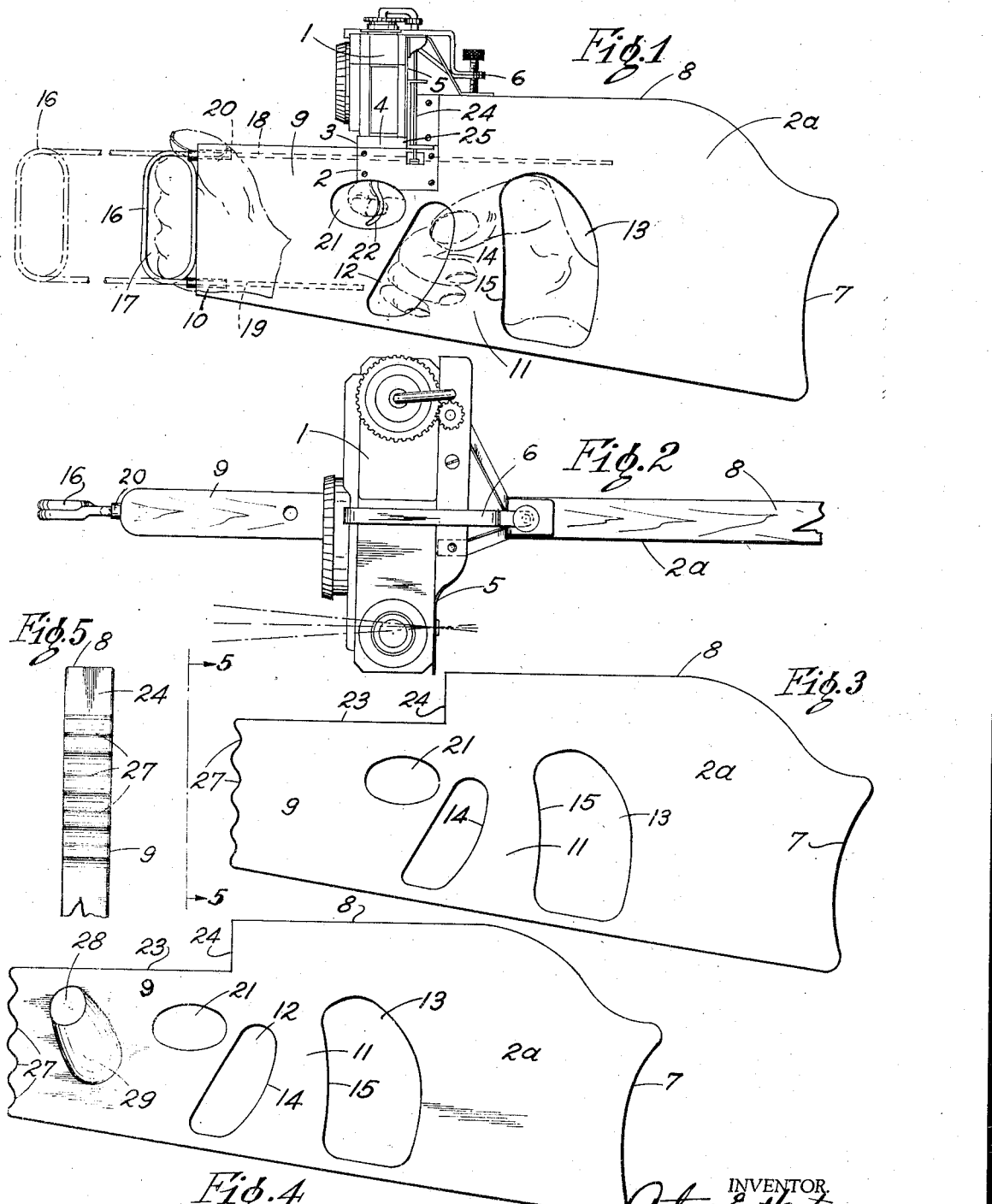
INVENTOR
Arthur E. Hart
BY Hawgood & Van Horn
his ATTORNEYS Patented Dec. 13, 1938

2,140,051

UNITED STATES PATENT OFFICE 2,140,051

CAMERA SUPPORT

Arthur E. Hart, Cleveland, Ohio

Application July 21, 1937, Serial No. 154,761

7 Claims. (Cl. 95—31)

My invention is an improvement in camera mountings and relates more particularly to mounting a camera, preferably of the roll film type, upon a gun stock or similar support.

It is one of the objects of my invention to mount a camera upon a stock like support or rest similar in some respects to a gun stock, so that the camera and support may be operated quickly and conveniently without interference with the use of the camera mounted sight or finder.

Another object of my invention is to provide a mounting of this type which is extremely simple in construction and easy to operate and which affords positive control over the camera at all times during use.

A further object of the invention resides in the provision of a camera support which is adapted to be handled in a manner similar to that of handling a gun or rifle.

A still further object of the invention is to construct a stock of the above named character which is characterized by having a camera supporting portion forward and above the main body portion and cheek and shoulder rests rearwardly thereof.

Another object is to so mount the camera on a gun stock or the like that the finder of the camera may be brought close to the eye of the operator and further to provide a shoulder and cheek rest for the operator in use.

Other objects and advantages of my invention will become more apparent from the following description of several embodiments thereof, reference being made to the accompanying drawing in which like reference characters are employed to designate like parts throughout the same.

In the drawing:

Figure 1 is a side elevation of a device embodying one form of my invention;

Figure 2 is a top plan view of the device shown in Figure 1;

Figure 3 is a side elevation of a device embodying another form of my invention;

Figure 4 illustrates a third form of my invention; and

Figure 5 is a view taken in the direction of line 5—5 of Figure 3.

In carrying out my invention, I have provided a camera support shaped and constructed in a manner generally resembling a gun stock, but which possesses several advantages more fully appearing in the following description.

Referring now more particularly to the embodiment of my invention illustrated in Figures 1 and 2 of the accompanying drawing, the camera is indicated generally at 1. In the device shown the camera is of the so-called "candid" camera type, and due to its compactness is easily removably mounted on a plate 2 carried on the rest 2a having upstanding flanges 3 and 4 along its front edge and side edges respectively to aid in properly positioning the camera on the support.

A back plate 5 extends upwardly from the base plate 2 and forms with the plate 2 and flanges 3 and 4 a rigid support or receptacle for the camera 1. In order to removably secure the camera in the receptacle or support, I have provided a form of removable clamp 6.

According to my invention the stock or support 2a may be fashioned from wood or it may be formed of metal in any suitable manner and includes an elongated body portion having at its rear end a concaved portion 7 shaped to comfortably fit the shoulder of the user. Forwardly of the shoulder rest 7 the body is formed with an upwardly crowned portion 8 forming a cheek rest. The body 2a also is provided with a forward extension 9 of reduced cross sectional area. This extension not only forms a ledge with the body 2a for supporting a camera, but also terminates in a hand grip at its outer end 10.

My copending application, Serial Number 153,039 filed July 10, 1937, discloses a stock type camera support similar to that shown in Figures 1 and 2 of the accompanying drawing.

In that application, however, I have also shown, described and claimed certain novel shutter actuating and film advancing mechanism.

The present application is primarily directed to the stock support and the gripping means associated therewith.

The stock body 2a is provided with a downwardly extending hand grip 11 formed by the voids or openings 12 and 13 and is shaped to comfortably fit within the clenched palm of the user's one hand, the opening 12 being adapted to receive the fingers while the opening 13 receives the thumb and a portion of the wrist as illustrated in the figures. The grip 11 includes the front and rear curved and downwardly diverging walls 14 and 15 respectively.

In the embodiment illustrated in Figures 1 and 2 the forward grip includes the forward end of the extension 9 and a looped or similar member 16 having an opening 17 to receive the fingers of the user's other hand.

When the device is used in connection with shutter loading and/or film advancing mechanism, the grip 16 may be provided with slides 18 and 19 which operate in suitable channels within the stock rest 2a, there being a suitable stop 20 to limit the outward movement of the grip 16. When the grip 16 is in its outermost position, of course this member alone serves as the grip, but when this member is retracted, as shown, the palm and fingers of the user's hand may also firmly grip the extended end 9, thus providing for a firm support by the user. In this manner the camera mounted on the stock and the stock itself is under complete control of the operator at all times, even during operation of the slide grip.

A trigger guard 21 is also provided in the stock rest 2a and houses the trigger 22. The trigger may be connected through any suitable mechanism to operate the camera shutter, one of the fingers of the user's hand being insertable within the guard to operate the trigger as shown.

When it is desired to mount a motion picture camera upon the stock, the movable grip 16 may be held stationary in the stock in use or it may be dispensed with entirely, since with this type of camera it is only necessary to release the shutter actuating mechanism and this may be done by pulling the trigger 22.

It is to be noted that the intersecting walls 23 and 24 form a seat for the camera. As shown in Figures 1 and 2, a suitable receptacle 25 may be secured in the seat to receive the camera, the clamp 26 being utilized to removably secure the camera in the receptacle.

In Figures 3 and 5 I have illustrated a second embodiment of my invention which in essential characteristics is similar to the form already described. In this second form, however, I have eliminated the forward movable hand grip and have formed the forward end of the extended portion 9 of the stock with a vertical series of depressions 27 extending across the front end to receive the fingers of one hand of the user.

In Figure 4 I have illustrated a third form of the invention which is similar to that of Figures 3 and 5 except that I have in addition provided a thumb hole 28 adjacent the vertical series of depressions 27.

The thumb hole 28 is formed in the extension 9 preferably at an acute angle to the plane of the stock, so that when the hand is in the approximate position to the left in Figure 1, the thumb will comfortably fit into the opening 28. The material of the stock is tapered away from the lower side of the opening as at 29 to increase the comfort of the grip.

While all three modifications illustrate devices which are particularly useful with motion picture cameras only, those illustrated in Figures 3 to 5 inclusive show a fixed hand grip formed at the forward end of the extension 9.

I have found by the use of my invention that the operator has complete control over the camera mounted on top of the stock. This is due to the provision of the forward hand grip, the grip 11 formed in the stock body and to the alignment of these grips with the shoulder rest 7.

When the stock is gripped as shown, and the portion 7 is in position on the user's shoulder, a very firm control over the movement of the stock is produced. Furthermore, by mounting the camera on top of the stock, the camera sight or finder is closely adjacent the operator's eye as the cheek rests upon the upwardly extending portion 8.

The device is very simple of construction and inexpensive to manufacture, the stock body being preferably formed in one piece. By my invention, the device is so constructed that various types of both still and motion picture cameras may be used with it.

Various changes in the details of construction and arrangement of parts may be made without departing from the spirit of my invention or the scope of the appended claims.

I claim:

1. In a photographic device, a stock and a camera mounted on the top of said stock, said stock comprising a main body portion and a portion extending forwardly of the camera, and a hand grip on each of said portions.

2. A stock rest for cameras and the like comprising as a unitary structure an elongated body having voids formed therein, the portion of the body between the voids comprising a hand grip.

3. A stock rest for cameras and the like comprising as a unitary structure an elongated body having voids formed therein, the portion of the body between the voids comprising a hand grip, said body having a forwardly extending portion forming with the main body portion a seat for a camera or the like.

4. A stock rest for supporting a camera or the like comprising an elongated body having a camera supporting portion intermediate its ends and having voids formed therein, the portion of the body between certain of the voids comprising a fixed hand grip, and a hand grip formed at the forward end of the stock body and forwardly of the camera supporting portion.

5. A stock rest for cameras and the like comprising an elongated body having voids formed therein, the portion of the body between the voids comprising a hand grip, and a movable hand grip formed at the forward end of the body.

6. A stock rest for cameras and the like comprising an elongated body having voids formed therein, the portion of the body between the voids comprising a hand grip, and a hand grip formed at the forward end of the body, said last named hand grip comprising a plurality of finger depressions formed in the said body end.

7. A stock rest for cameras and the like comprising an elongated body having voids formed therein, the portion of the body between the voids comprising a hand grip, and a hand grip formed at the forward end of the body, said last named hand grip comprising a plurality of finger depressions formed in the said body end, and a thumb aperture in the body adjacent certain of said depressions.

ARTHUR E. HART.